US009026948B2

(12) United States Patent (10) Patent No.: US 9,026,948 B2
Hammontree et al. (45) Date of Patent: May 5, 2015

(54) MULTI-FACETED RELATIONSHIP HUBS

(75) Inventors: Monty L. Hammontree, Duvall, WA (US); Weston Hutchins, Seattle, WA (US); Zachary S. Zaiss, Seattle, WA (US); Matthew S. Johnson, Kirkland, WA (US); Steven John Clarke, Edinburgh (GB); Adam D. Nathan, Redmond, WA (US); Adrian M. Collier, Bellevue, WA (US); Vikram Bapat, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 251 days.

(21) Appl. No.: 13/171,496

(22) Filed: Jun. 29, 2011

(65) Prior Publication Data

US 2013/0007671 A1 Jan. 3, 2013

(51) Int. Cl.
*G06F 17/30* (2006.01)
*G06F 3/048* (2013.01)
*G06F 9/44* (2006.01)

(52) U.S. Cl.
CPC ............ *G06F 17/30716* (2013.01); *G06F 8/33* (2013.01)

(58) Field of Classification Search
CPC ................................. G06F 17/30716
USPC ........................................................ 715/853
See application file for complete search history.

(56) References Cited

U.S. PATENT DOCUMENTS

| 6,393,437 | B1 | 5/2002 | Zinda |
| 6,662,357 | B1 | 12/2003 | Bowman-Amuah |
| 7,162,488 | B2 | 1/2007 | DeVorchik et al. |
| 7,315,826 | B1 | 1/2008 | Guheen |
| 7,359,990 | B2 | 4/2008 | Munir |
| 7,403,901 | B1 | 7/2008 | Carley |
| 7,467,198 | B2 | 12/2008 | Goodman |
| 7,496,830 | B2 | 2/2009 | Rubin et al. |
| 7,552,429 | B2 | 6/2009 | Dettinger |
| 7,716,640 | B2 | 5/2010 | Pik et al. |
| 7,788,273 | B2 | 8/2010 | Torres et al. |
| 7,802,234 | B2 | 9/2010 | Sarukkai |
| 7,818,677 | B2 | 10/2010 | Ruthfield et al. |
| 7,860,817 | B2 | 12/2010 | Sweeney et al. |
| 8,253,730 | B1 * | 8/2012 | Carr .............................. 345/419 |
| 2003/0105620 | A1 | 6/2003 | Bowen |
| 2004/0003091 | A1 | 1/2004 | Coulthard |
| 2005/0091254 | A1 | 4/2005 | Stabb |
| 2005/0251748 | A1 | 11/2005 | Gusmorino |

(Continued)

OTHER PUBLICATIONS http://www.wintellect.com/cs/blogs/jrobbins/archive/2009/06/16/how-does-vs2010-historical-debugging-work.aspx as of Jun. 16, 2009.*

(Continued)

*Primary Examiner* — William Bashore
*Assistant Examiner* — Nathan Shrewsbury
(74) *Attorney, Agent, or Firm* — Kevin Sullivan; Kate Drakos; Micky Minhas

(57) ABSTRACT

Multi-faceted relationship hubs can support browsing an extensible set of relationship types from within a single tool window. A user can switch between relationship types within a single tool window without disrupting user flow by having to change context in a plurality of tool windows. Multiple instances of relationship hubs can be created. Browsing navigation history can be stored, allowing a user to maintain and reacquire relationship contexts. A user can preview the content of one or more files without opening the file.

17 Claims, 10 Drawing Sheets

(56) References Cited

U.S. PATENT DOCUMENTS

| | | | |
|---|---|---|---|
| 2006/0074929 A1* | 4/2006 | Weber et al. | 707/100 |
| 2008/0005235 A1 | 1/2008 | Hegde | |
| 2008/0065596 A1* | 3/2008 | Shadmon et al. | 707/2 |
| 2008/0089246 A1* | 4/2008 | Ghanwani et al. | 370/256 |
| 2008/0098025 A1* | 4/2008 | Vadlamani et al. | 707/102 |
| 2008/0120129 A1* | 5/2008 | Seubert et al. | 705/1 |
| 2008/0288886 A1* | 11/2008 | Sherwood et al. | 715/772 |
| 2008/0294771 A1* | 11/2008 | Hermes et al. | 709/224 |
| 2009/0024937 A1 | 1/2009 | Lauff | |
| 2009/0049066 A1* | 2/2009 | Wu | 707/100 |
| 2009/0063473 A1* | 3/2009 | Van Den Berg et al. | 707/5 |
| 2010/0293546 A1* | 11/2010 | Liu et al. | 718/100 |
| 2011/0167404 A1* | 7/2011 | Liu et al. | 717/106 |
| 2011/0271257 A1 | 11/2011 | Terris | |
| 2011/0271258 A1 | 11/2011 | Park | |
| 2012/0054226 A1* | 3/2012 | Cao et al. | 707/769 |
| 2012/0191759 A1* | 7/2012 | Best et al. | 707/797 |
| 2012/0284689 A1 | 11/2012 | Armstrong | |
| 2012/0291012 A1 | 11/2012 | Robison | |
| 2012/0324423 A1 | 12/2012 | Khan | |
| 2013/0007671 A1* | 1/2013 | Hammontree et al. | 715/853 |

OTHER PUBLICATIONS

Professional Visual Studio® 2010 By: Nick Randolph (Publisher: Wrox May 3, 2010).*

Professional Visual Studiog® 2010 By: Nick Randolph pp. 63-65(Publisher: Wrox May 3, 2010).*

Moving to Microsoft Visual Studio 2010 by Patrice Pellance, Microsoft Press Jul. 15, 2010 (Pellance).*

Vejella, Hima., "Visual Studio 2010 and .NET Framework 4 IDE Enhancements—Part3", Retrieved at <<http://dotnetslackers.com/articles/net/Visual-Studio-2010-and-NET-Framework-4-IDE-Enhancements-Part3.aspx>>, Jan. 8, 2010, pp. 13.

Dykstal, David., "What's new in IBM Rational Developer for Power Systems Software Version 7.5", Retrieved at <<http://www.ibm.com/developerworks/rational/library/10/whatsnewinrationaldeveloperforpowersystems7-5/index.html?ca=drs->>, Mar. 18, 2010, pp. 7.

O'Conner, John., "Create Great-Looking GUIs With NetBeans IDE 5.5", Retrieved at <<http://java.sun.com/developer/technicalArticles/tools/nb_guibuilder/>>, Nov. 2006, pp. 6.

Vestdam, Thomas., "Elucidative Programming in Open Integrated Development Environments for Java", Retrieved at <<http://citeseerx.ist.psu.edu/viewdoc/download;jsessionid=1F6D3FD3AE487899058639211A0A8039?doi=10.1.1.8.7401&rep=rep1&type=pdf>>, Proceedings of the 2nd International Conference on the Principles and Practice of Programming in Java—PPPJ, Jun. 16-18, 2003, pp. 6.

"Preview & Navigate Tab Content via Popup in FireFox", Retrieved at <<http://www.tothepc.com/archives/preview-navigate-tab-content-via-popup-in-firefox/>>, Retrieved Date: Mar. 9, 2011, pp. 4.

"Interactive Development Environment (IDE) Enhancements", Retrieved at <<http://msdn.microsoft.com/en-us/library/aa976855(v=vs.71).aspx>>, Retrieved Date: Mar. 9, 2011, pp. 5.

"Change how the Reading Pane looks and works", Retrieved at <<http://office.microsoft.com/en-us/outlook-help/change-how-the-reading-pane-looks-and-works-HP005242695.aspx>>, May 7, 2011, p. 1.

Collier, Adrian., "The Visual Studio Blog", Retrieved at <<http://blogs.msdn.com/b/visualstudio/archive/2010/07/20/solution-navigator-blog-post.aspx?PageIndex=2>>, Retrieved Date: Jun. 7, 2011, pp. 21.

Dakka, et al., "Automatic Construction of Multifaceted Browsing Interfaces", Retrieved at <<http://citeseerx.ist.psu.edu/viewdoc/download?doi=10.1.1.85.325&rep=rep1&type=pdf>>, Proceedings of the 14th ACM international conference on Information and knowledge management, Oct. 31-Nov. 5, 2005, pp. 768-775.

"Navigating and Searching (Visual C#)", Retrieved at <<http://msdn.microsoft.com/en-us/library/ms173082%28VS.90%29.aspx>>, Retrieved Date: Jun. 7, 2011, pp. 3.

"Managing a Working Set in an Integrated Development Environment", U.S. Appl. No. 13/106889, filed: May 13 2011, pp. 1-19.

U.S. Appl. No. 13/106,889, Non-Final Rejection dated Feb. 15, 2013, 13 pages.

U.S. Appl. No. 13/106,889, Amendment dated May 13, 2013, 13 pages.

U.S. Appl. No. 13/106,889, Final Rejection dated Sep. 3, 2013, 30 pages.

U.S. Appl. No. 13/106,889, Amendment After Final Rejection dated Dec. 3, 2013, 13 pages.

U.S. Appl. No. 13/106,889, Notice of Allowance dated Mar. 31, 2014, 18 pages.

U.S. Appl. No. 13/106,889, Supplemental Notice of Allowability dated Apr. 28, 2014, 8 pages.

* cited by examiner

MULTI-FACETED RELATIONSHIP HUBS

CROSS-REFERENCE TO RELATED APPLICATIONS

The application is related in subject matter to U.S. patent application Ser. No. 13/106,889 entitled "MANAGING A WORKING SET IN AN INTEGRATED DEVELOPMENT ENVIRONMENT" filed May 13, 2011.

BACKGROUND

Understanding and working with program code often involves identifying, navigating, and reorienting across a variety of relationship types in the code and code related work products (e.g., work items, requirements, bugs, etc.). Typically in an Integrated Development Environment (IDE), the IDE exposes relationships in code through a series of independent tool windows in which each tool window handles a subset of relationship types. This approach means that a user typically has to manage multiple tool windows and repeatedly has to reestablish context within the tool windows as he tries to understand the various relationship types. In addition to having to reestablish context across tool windows, the context within a given tool window typically is overwritten as successive explorations occur. Additionally, a user often has to open code files within an IDE to examine the related code that is of possible interest. In an approach where each navigated relationship results in a durably opened file, it becomes difficult to keep track of what files are open and what is of interest in the open files. The cumulative effect of how relationship identification, navigation, and code examination is handled is a user flow that is interrupted by the need to remedially establish context and/or dismiss tools and content that are no longer relevant.

Some IDEs support browsing the code element hierarchy of a package or file at a sub-package/file level, including source contents and any referenced libraries. Known hierarchical code element browsers (e.g., Eclipse) are single faceted, only allowing a user to browse a single information hierarchy. If a user wishes to explore relationships of a different type than that managed in the current hierarchy the user has to switch to a different tool window. When the user switches to the different tool window, the user has to re-establish context. For example, suppose a user has navigated to a particular method in a particular source code file. To find the methods called by that method, the user would have to open another tool window (e.g., a call hierarchy tool window) and manually navigate to the desired caller. Moreover, different tool windows can have inconsistent user experiences. For example, two tree-like controls can behave differently. Differing implementations can also inhibit the use of features such as being able to drag and drop items from one tool window to another.

SUMMARY

Multi-faceted relationship hubs can support browsing an extensible set of relationship types from within a single tool window that can include multiple information panes. A user can switch between relationship types within a single tool window without disrupting user flow by having to change context in a plurality of tool windows. Multiple instances of relationship hubs can be created. Navigation history that captures node hierarchy, selection, expansion and scroll states can be stored, allowing a user to maintain and reacquire relationship contexts. A user can examine the content of one or more files without having to fully open the file.

Parent, sibling, and child nodes of any node in an information hierarchy can be viewed. Relationships that involve the node but that are not part of the current hierarchy can also be explored. As information nodes are explored, associated content can be presented in a preview area, to avoid adding to a set of working files. A previewed file is one that is opened provisionally and is transient. Previewed files are not automatically added to the set of files comprising the user's working set. That is, a previewed file is not added to the working set programmatically, triggered by or in response to the file being previewed, without an explicit user action or intervention that causes the file to be added to the working set.

New relationship types can be added by third parties. Search provider models can be optimized for the particular information structures offered. A navigation stack or history can be maintained to allow navigation into and out of information structures. Provisions for jumping back to the original root or home view for a given hub type can also be provided. Multiple instances of a hub display or window can be created to enable multiple concurrent relationship sets to be accessed. A track active item feature can be turned on or off for each hub instance so that one or more hub instances can be dynamically tracked while others maintain focus independently from the active document focus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
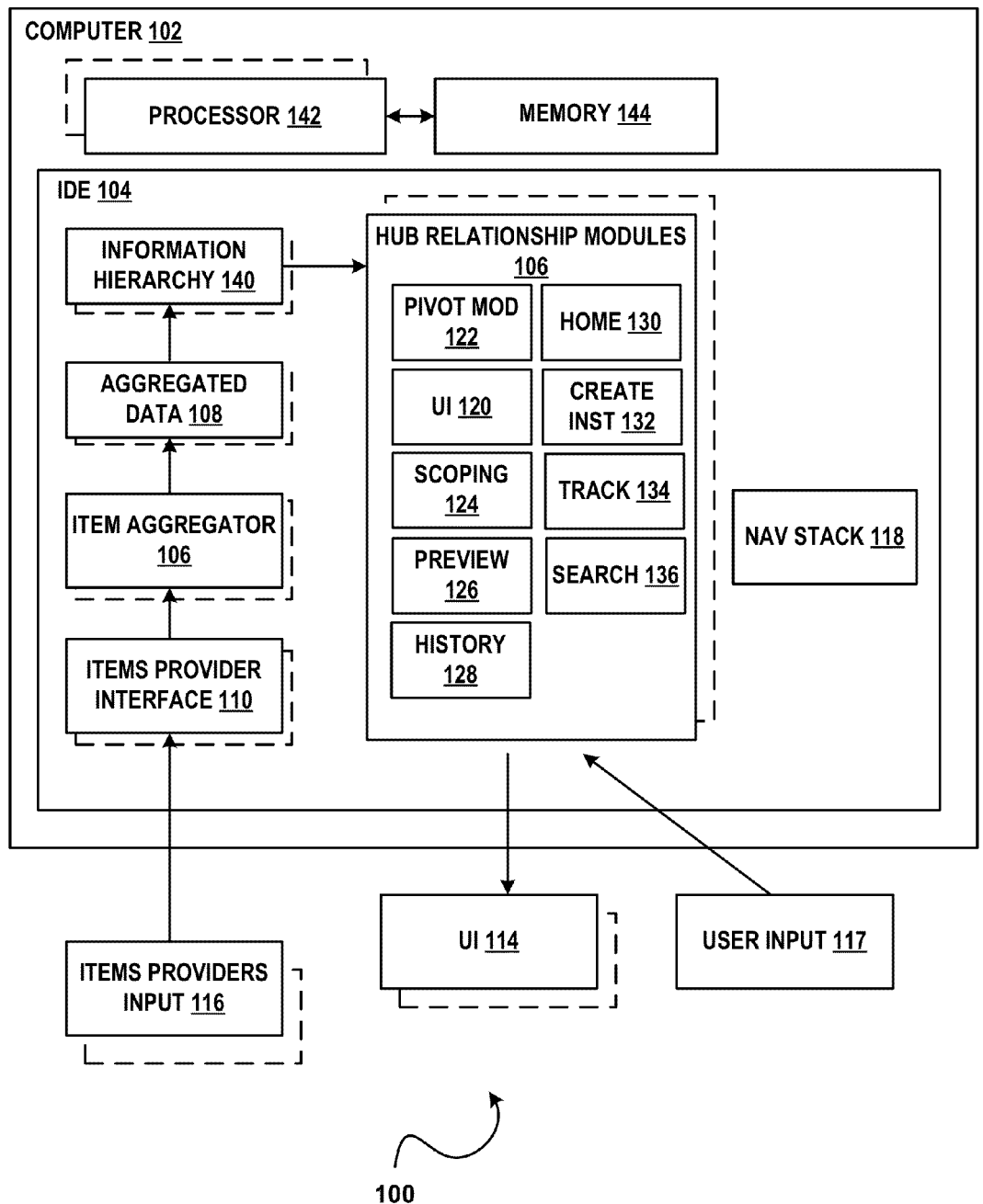
FIG. 1 illustrates an example of a system 100 that can display relationship hubs in accordance with aspects of the subject matter disclosed herein.

Multi-dimensional information structures can be explored in a single user interface (UI) such as but not limited to a tool window. The single user interface can include one or more content viewing panes and one or more navigation panes displayed concurrently in the user interface with the content viewer scrolled to an area that corresponds to a location (e.g., node) selected within the information hierarchy. Parent, sibling, and child nodes of an information node in an information hierarchy can be explored. A relationship that is not part of the current hierarchy can also be explored in the same user interface by selecting a relationship from a context menu or other user interface option. Relationship information is extensible and can be provided by a third party. Relationship information can be associated with one or more nodes of an information hierarchy and can provide additional information associated with the at least one node. A many-to-many relationship can exist between information hierarchies and relationships. The action a user performs to switch the view and browse relationships for the selected node is called pivoting. The view of the information hierarchy displayed can be changed without switching context in multiple tool windows by rerooting the information hierarchy being viewed. Rerooting replaces the root node of a tree being viewed with the selected information node in the information hierarchy. That is, in response to selecting a relationship to be switched to, a currently selected node can be elevated to become the root node in a new tree hierarchy with the children of the selected relationship displayed below it. Rerooting can be repeated any number of times for any of the nodes in the information hierarchy.

Scoping executes a rerooting operation on the selected node, so that the selected node becomes the root of the new information hierarchy without selecting a relationship that is not part of the current hierarchy. Children of the selected node can be presented in the view.

Information nodes that are browsed can be presented in a preview area. By presenting explored content in a preview area rather than durably opening the content when it is selected for viewing, a user can examine the content without adding it to his working set, thereby reducing the number of durably opened files that he has to manage. Previewing is described in more detail in U.S. patent application Ser. No. 13/106,889 entitled "MANAGING A WORKING SET IN AN INTEGRATED DEVELOPMENT ENVIRONMENT" filed May 13, 2011, which is hereby incorporated by reference in its entirety.

Relationship hubs can be based on an extensible information provider architecture that allows new relationship types to be added by third parties. Information providers can provide information that can be associated with one or more nodes in the information hierarchy and which can provide information from which additional children nodes can be derived for associated nodes in the information hierarchy. Information providers can provide search results, artifacts (e.g., indices) and/or search logic that provides additional information, understanding and/or value to the search operation. A navigation stack can be provided to enable navigation into and out of information structures created during explorations conducted within a hub so that previous explorations or views can be revisited easily. A view can be any visual representation of an information hierarchy. The view itself can be but is not necessarily hierarchical. New views can be created by pivoting on a node in the tree. Any tree node in the information hierarchy can be selected to become the root. Each tree node can expose different children depending on the relationship selected. Each time a pivot operation is executed, a new view with the selected node as the root can be created. The previous view can be added to the navigation stack. A "home" view for a particular hub type (returning to a view based on the initial root displayed) can be accessed directly by selecting a user option.

Multiple instances of a tool window can be created so that a plurality of concurrent relationship sets that behave independently can be viewed. By combining the relationship pivoting and rerooting capability described above with the ability to multi-instance a hub window, a user can work with multiple concurrent relationship sets across multiple pivots.

The active element within the currently active document window can be optionally tracked or not tracked. Tracking enables navigation or selection actions taken in the editor window to be synced in the current hierarchy view. For example, opening a document with the tracking feature turned on can scroll the node representing that document into view in the information hierarchy and can select the node, making it easy for the user to find other items near the document in the information hierarchy. There may be times when active element tracking is advantageous and other times when active element tracking feels clumsy, hence a user is provided an option to turn the track active item feature on or off. In an environment where multiple instances of relationship hubs are created, not all instances have to be tracked to a single active document context. The decision as to whether to "track active item" on a hub instance can be made on a hub by hub instance basis. This allows a user to have one or more hub instances that dynamically track while having one or more other hub instances maintain focus independently from the active document focus. By default the feature is turned off.

It will be appreciated that while the subject matter described herein is described within the context of software development, the concepts described can be applied to any information hierarchy including but not limited to file system hierarchies, organizational hierarchies, database hierarchies and cloud services hierarchies. Moreover it will be appreciated that the subject matter described herein can be applied to any information however structured that can be converted to an information hierarchy. As long as the information structure can be defined by a set of node categories and relationships, the subject matter described herein can be used to allow navigation through the information structure.

Multi-Faceted Relationship Hubs

FIG. 1 illustrates an example of a system 100 for creating, displaying and interacting with relationship hubs in accordance with aspects of the subject matter disclosed herein. A relationship hub display can allow browsing and searching of information hierarchies including but not limited to directories, sub-directories, files, content of files and relationships within elements in the files in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 may execute within an IDE such as IDE 104 or may execute outside of an IDE. IDE 104 can be an IDE such as the one described with respect to FIG. 4 or can be any other IDE. All or portions of system 100 may be implemented as a plug-in or add-on.

System 100 may include one or more computers or computing devices such as a computer 102 comprising: one or more processors such as processor 142, etc., a memory such as memory 144, and one or more modules that enables browsing and searching of information hierarchies including but not limited to directories, sub-directories, files, content of files and relationships within elements in the files in accordance with aspects of the subject matter disclosed herein. In FIG. 1 this module or modules is represented by hub relationship module 106, etc., as described herein. Other components well known in the arts may also be included but are not here shown. It will be appreciated that one or more modules such as hub relationship module 106 can be loaded into memory 144 to cause one or more processors such as processor 142 to perform the actions attributed to the one or more modules.

Hub relationship module 106, etc. can include one or more modules that perform one or more of following functions. A user interface module 120 can display multi-dimensional information structures in a single user interface such as but not limited to a tool window, represented in FIG. 1 by user interface 114, etc. Parent, sibling, and child nodes of an information node in an information hierarchy can be explored in a view using user interface 114, etc. A view can be a visual representation of a tree-based hierarchy in the tool window. The view itself can be hierarchical or non-hierarchical (e.g., flat). Any tree node in the information hierarchy can be selected to become the root. Each tree node can expose different children depending on a selected relationship. User interface 114 can also display concurrently with the view of the information hierarchy a content viewer pane that displays the content of a selected node in the information hierarchy. A pivot module 122 can receive a selection of a relationship from a context menu or other user interface option for a selected node in the information hierarchy and in response can replace the original root node of the information hierarchy with the selected node in the information hierarchy and can add information nodes from the selected relationship to the new tree. Pivot module 122 can be called any number of times within a user session for any of the nodes in the information hierarchy. A scoping module such as scoping module 124 can reroot the information hierarchy on the selected node and can show a "contains" relationship (e.g., show the children of the selected node).

Preview module 126 can present browsed information nodes in a preview area. By presenting explored content in a preview area rather than durably opening the content when it is selected for viewing, a user can examine the content without adding it to his working set (the set of open files displayed in tabs in a document well), thereby reducing the number of durably opened files that he has to manage.

Relationship hubs can be based on an extensible information provider architecture that allows new relationship types to be added by third parties. Information providers can provide search results, search logic, and/or any other search artifacts that apply to the information provided by the information providers.

A navigation stack such as navigation stack 118 can be maintained by history module 128 to enable navigation into and out of information structures created during explorations conducted within a hub so that previous explorations or views can be revisited easily. A home module such as home module 130 can return to a view for a particular hub type based on the initial root displayed in response to receiving a user selection selecting a "home" option. Each time a pivot operation is executed, a new view with the selected node as the root can be created and the previous view can be added to the navigation stack 118.

Multiple instances of a tool window can be created by an instance creating module such an instance creating module 132 so that a plurality of concurrent relationship sets that behave independently can be viewed. By combining the relationship pivoting and rerooting capability described above with the ability to multi-instance a hub window, a user can work with multiple concurrent relationship sets across multiple pivots.

A tracking module such as tracking module 134 can track an active element within the currently active document window. Tracking enables navigation or selection actions taken in the currently active document window to be automatically reflected and synchronized with the current hierarchy view. A user can be provided with an option to turn the track active item feature on or off on a hub by hub instance basis. This allows a user to have one or more hub instances that dynamically track while having one or more other hub instances maintain focus independently from the active document focus. By default the feature can be turned off or can be turned on.

A search module such as search module 136 can provide searching functionality with inline results in the display. By default, in accordance with some aspects of the subject matter disclosed herein, the "Contains" relationship can be searchable. The search results can be hierarchical. For example, suppose an independent system "Files" provides a hierarchical structure to a set of files in a software project, and a dependent system "FileContents" provides hierarchical structure to data contained in files. When running a search query, the search module can query the "Files" and "FileContents" systems separately. From data returned from each system, the search module can determine how to create a seamless hierarchical structure that places results from the "FileContents" system within the correct corresponding results from the "Files" subsystem.

One or more items providers can provide items provider input such as items provider input 116, etc. via an items provider interface 110 to an items aggregator module 106. Items aggregator module 107 can aggregate the data provided to create aggregated data 108 from which an information hierarchy such as information hierarchy 140 can be created. Multiple information hierarchies can be created. The information hierarchy 140 can be represented by a directed graph of items. Each item in the graph can be related to other items via relationships. Related items do not have to be directly attached to the core item itself. In fact, the core item can be unaware of the other types of items related to it. Related items can be provided by an items provider. An items provider can include metadata that associates a relationship identity with the items provider. Relationship identities allow multiple items providers to provide items for the same relationship. For example, two different items providers may provide a "Contains" relationship for files: one items provider may provide C# types for files and another items provider may provide child files for files. User input such as user input 117 can be provided to select nodes, select from available options and so on to direct the flow of the interaction.

To display user-visible metadata about a relationship, an export interface can be provided. The export interface can define the text, and content of a tooltip provided to describe the relationship to a user. Although multiple items providers can provide items for the same core item and relationship, the relationship can only have a single display item. Metadata associated with an items provider item can specify the source item and the relationship used to create it, and the items in the provided relationship, services that enumerate the relationships that apply to a particular source item, an interface for a source item and relationship that can provide an aggregate view of the interface instances provided by extension points that apply to the source item and relationship.

Suppose, for example, a source item instance of type Assembly exists. A relationship services interface can provide a way to enumerate the relationship description interfaces that apply to the Assembly. Since an Assembly contains Type instances, there may be an items provider interface that provides types from the assembly. Assemblies also may contain resources, so there may be an additional items provider interface that provides the resources from the assembly. Furthermore, a third items provider interface may provide references to other assemblies.

For a particular relationship such as, for example, the Contains relationship, the interface for the relationship service can create an items source for the assembly. In its implementation, the interface for the relationship service can enumerate each interface for items providers matching the Contains relationship and can call another interface that determines if the items provider can provide related items for a given source item. The instances of the interfaces for the items provider instances can be enumerated in a specified order (sequence). This can determine the order in which multiple sub-collections will be aggregated. The relationship service can create a new aggregate items source which can project the instances of the items source interfaces created from each provider into a unified collection. The aggregate items source can return values for the multiple contained items source interface instances.

An inverse relationship provider for the Contains relationship can be created, facilitated by an extension point, which can take a source item as input and can return the parent item (i.e., the item that would provide the source item via a Contains items provider interface.)

Related items can be stored on the item itself if the item implements a caching interface. If the item does not implement a caching interface, the items source can be recreated each time a query is made on the relationship service interface tying the lifetime of items source with the item and relieving the relationship service interface of the need to deal with caching interface.

Hence, user interface 114, can be a UI that enables a user to browse, search and manage files, the contents of the files and relationships between items in the files from a single user interface or tool window. User interface 114 can be a software development UI that merges functionality from multiple displays or tools windows such as but not limited to any combination of: a display that provides a hierarchical view of source code files (e.g., Solution Explorer in Microsoft's Visual Studio® or the like), a display that provides a hierarchical view of source code classes (e.g., Class View in Microsoft's Visual Studio® or the like), a display that provides a hierarchical view of source code objects (e.g., Object Browser in Microsoft's Visual Studio® or the like), a display that provides a view of source code callers and source code callees (e.g., Call Hierarchy in Microsoft's Visual Studio® or the like), a display that for searching and browsing source code (e.g., Navigate To in Microsoft's Visual Studio® or the like) a display that provides a search functionality for source code (e.g., Find References in Microsoft's Visual Studio® or the like) and/or any other suitable user interface.

Figure 2A:
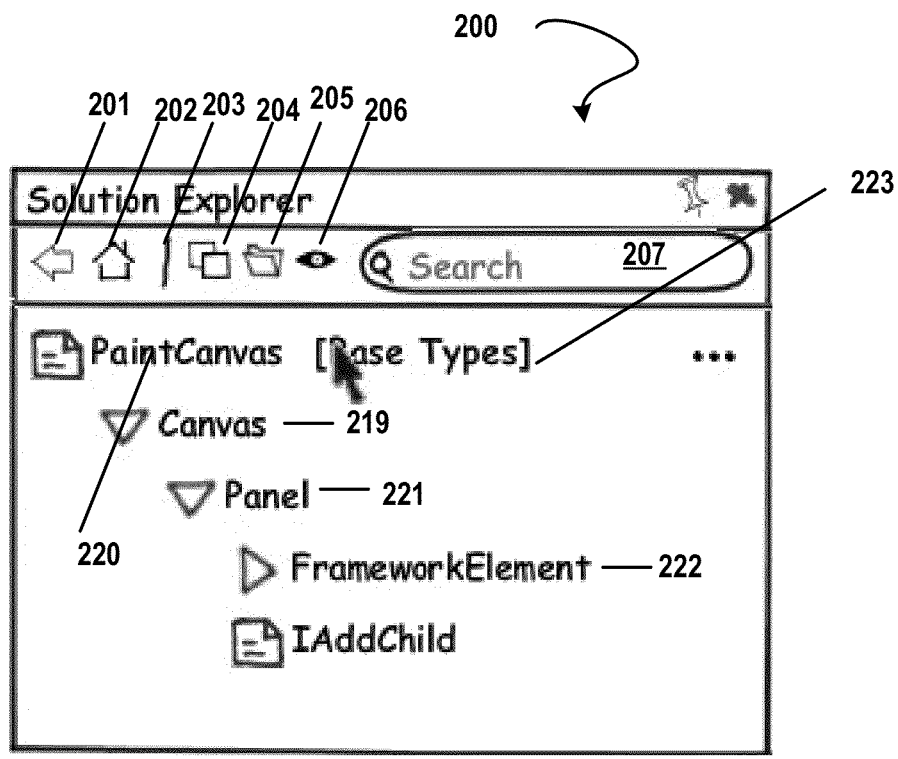
FIGS. 2a, 2b, 2c, 2d, and 2e are illustrations of examples of user interfaces in accordance with aspects of the subject matter disclosed herein.

FIG. 2a illustrates an example of a user interface 200 for user interface 114. In accordance with some aspects of the subject matter disclosed herein, user interface 200 can include one or more of the following toolbar buttons: a back button 201 that can be used for navigation, a home button 202 used for navigation, a collapse all button 203 that collapses all the nodes in the tree, a show all files button 204 that shows all the hidden files and folders contained under the root, a refresh button 205 that refreshes the current view, a track active item button 206 that selects the currently active document in the display. The track active item button can be a toggle button to allow the user to optionally leave tracking on or leave tracking off and a search bar 207.

User interface 200 can simplify and streamline browsing source code hierarchies and file contents and can also make it easier to understand code by enabling a user to explore relationships between nodes in the information hierarchy directly in the user interface without the need to open the class view, object browser, find all references, or call hierarchy user interfaces. A relationship can be defined as any available pivot on the currently selected node. Pivoting on a relationship can refresh the view, place the currently selected node at the root, and display information associated with the relationships as children under the root. For example, suppose a user is browsing through files and reaches the PaintCanvas class. Suppose the user wants to view the base types of the PaintCanvas class. Instead of using a class view display or an object browser display, the user can select a pivot action by, for example, clicking on the pivot icon. Selecting the pivot action can result in the display of available relationships. For example, relationships such as 'Base types' or 'Derived types' can be displayed.

In response to selection of a relationship, for example, the base types relationship, the view in the display can "pivot" on the PaintCanvas class node by refreshing the view and setting the PaintCanvas class node as the new root. The base types relationship for each node in the tree can then be browsed from within the single display.

A provider model can be exposed to allow items providers to add to the relationships available on a node in the tree. For example, the "view children" relationship can be exposed to view files and directories and other relationships can be implemented by an external provider.

Available relationships can include one or more of: all nodes within the information hierarchy, classes within the information hierarchy, fields or properties within the information hierarchy and methods within the information hierarchy. The all nodes relationship can be a "contains" relationship that provides a view of children of the node. This relationship can list elements/items contained inside the currently selected node. Elements/items contained within a file can be classes. Elements/items contained within a class can be the members of the class. Elements/items contained within a method can be the parameters of the method. The all nodes contained can be displayed by default by expanding a node, without needing selection of a pivot to be displayed. If a user pivots and then expands a node displayed as a result of the pivot action, the view can be scoped to the expanded node. (This option can be helpful to focus on a smaller subset of a large code base.) A view can be scoped to a directory, sub-directory, file or element within a file. For example, a software code base can be scoped to a selected project, file, type, or member.

The classes relationship can include but is not limited to: a view references option that can list the lines of source code that reference the selected node, a view base types view that can list the type from which the currently selected type inherits, a view derived types view that can show the classes which are derived from the selected class, and a view returned that can list the methods that return an instance of the currently selected class.

The field/property relationship can include but is not limited to an assigned by view that can list where the property was assigned a value and a type view that can list the type of the property. A methods relationship can include but is not limited to a called by view that can list the methods that call into the selected method and a calls view that can list the methods that the selected method calls.

Figure 2B:
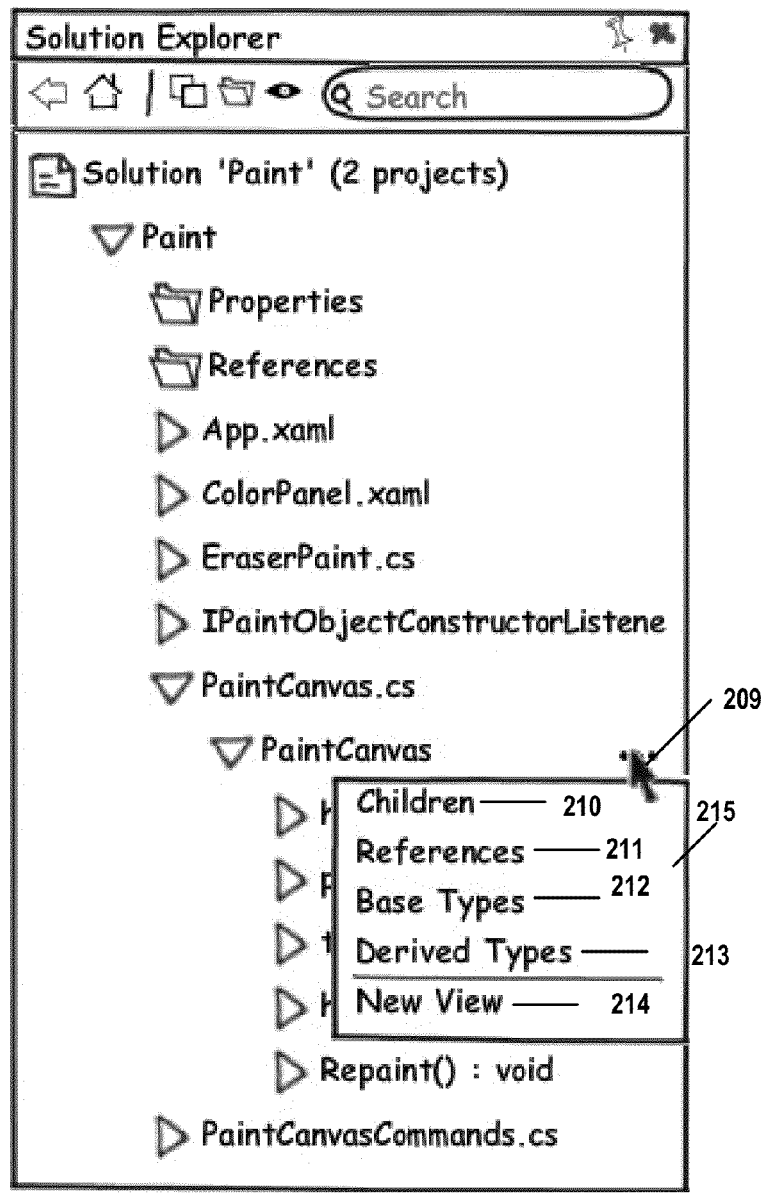

In accordance with aspects of the subject matter disclosed herein and as illustrated in example user interface 208 of FIG. 2b a user action can hover over any node in the tree and invoke the pivot icon 209 (either through clicking or keyboard navigation) to browse provider-supplied relationships for the currently selected node. This enables a user to view the relationships available before browsing to a node. It also enables a user to jump directly to a relationship without having to pivot and scroll to the relationship and to browse relationship trees without having to reroot. For example, browsing the base classes for a type can be done with one pivot rather than having to pivot on each type. FIG. 2b illustrates an example of pivot options Children 210, References 211, Base Types 212, and Derived Types 213 in option box 215.

Relationships associated with a node can be supplied by the items providers. Any items provider can add one or more relationships to the existing set of relationships for the node. In response to selection of a relationship (e.g., by left-clicking or by pressing "Enter") the view can be refreshed and the selected node can be set to be the root of the tree. FIG. 2a illustrates an example of a user interface 200 that can be returned in response to selection of Base Types 212 in FIG. 2b. The name of the relationship can be appended in brackets (e.g., [Base Types] 223) following the node name (e.g., Paint-Canvas 220) to allow a user to quickly view what relationship has been selected. Each parent node can apply the relationship to its children. For example, in FIG. 2a, Canvas is returned as the Base Type of PaintCanvas. Panel 221 is the Base Type of Canvas 219. FrameworkElement 222 is the Base Type of Panel 221 and so on. To browse a different relationship on a node, the view can be repivoted. This scenario is likely to occur when browsing the call hierarchy of a function and switching between "calls" and "called by."

Figure 2C:
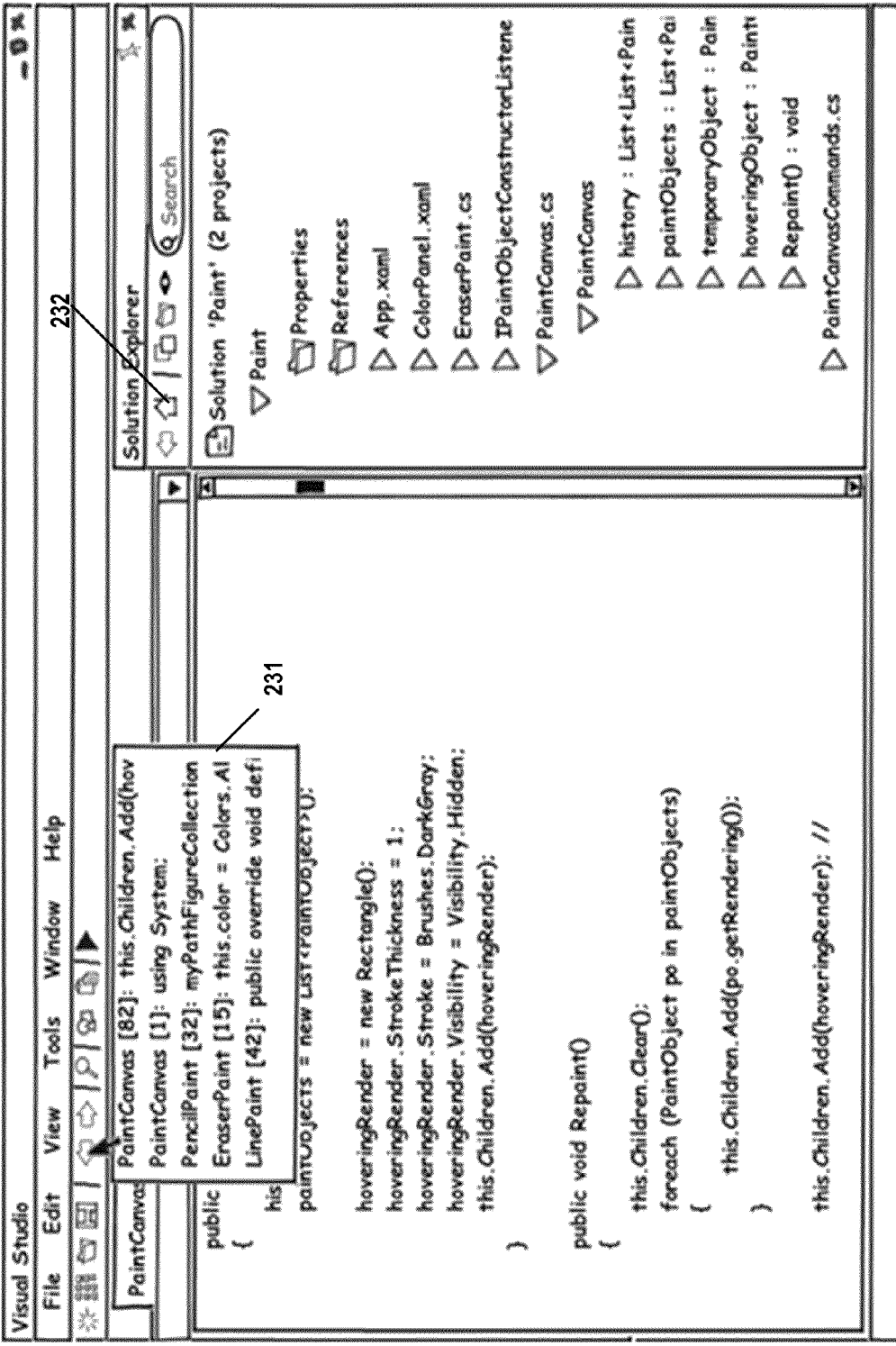

When browsing, the display can be repivoted multiple times on selected nodes within the information hierarchy. The display can also be repivoted on one or more relationships on the selected nodes. Throughout the browse session, a navigation stack such as navigation stack 118 can be maintained to keep track of the different views selected. The navigation stack can be traversed in reverse order to backtrack to a previously viewed view. FIG. 2c illustrates an example of a user interface 230 that displays navigation history 231. The start (default) view can be returned to by selecting a "home" operation. In accordance with aspects of the subject matter disclosed herein, selecting a "home" button (e.g., home button 232) can return the view to the original view, even in instances that have been scoped.

Views can be added to the navigation stack whenever the root node changes. For example, if a user pivots on method foo( ) with the relationship "Calls", the view can change to show the method foo( ) as the root of the tree. If the user then decides that he wants to see the methods that call foo( ) the user can pivot on foo( ) and select "Called By". In this case, selecting a back button may take the user back to the default view because the root node has not changed. If, however, the user selects a child of foo( ) and pivots on "Calls", this view can be added to the navigation stack. Selecting the back button in this case can take the user to the foo( ) (Calls) view.

Figure 2D:
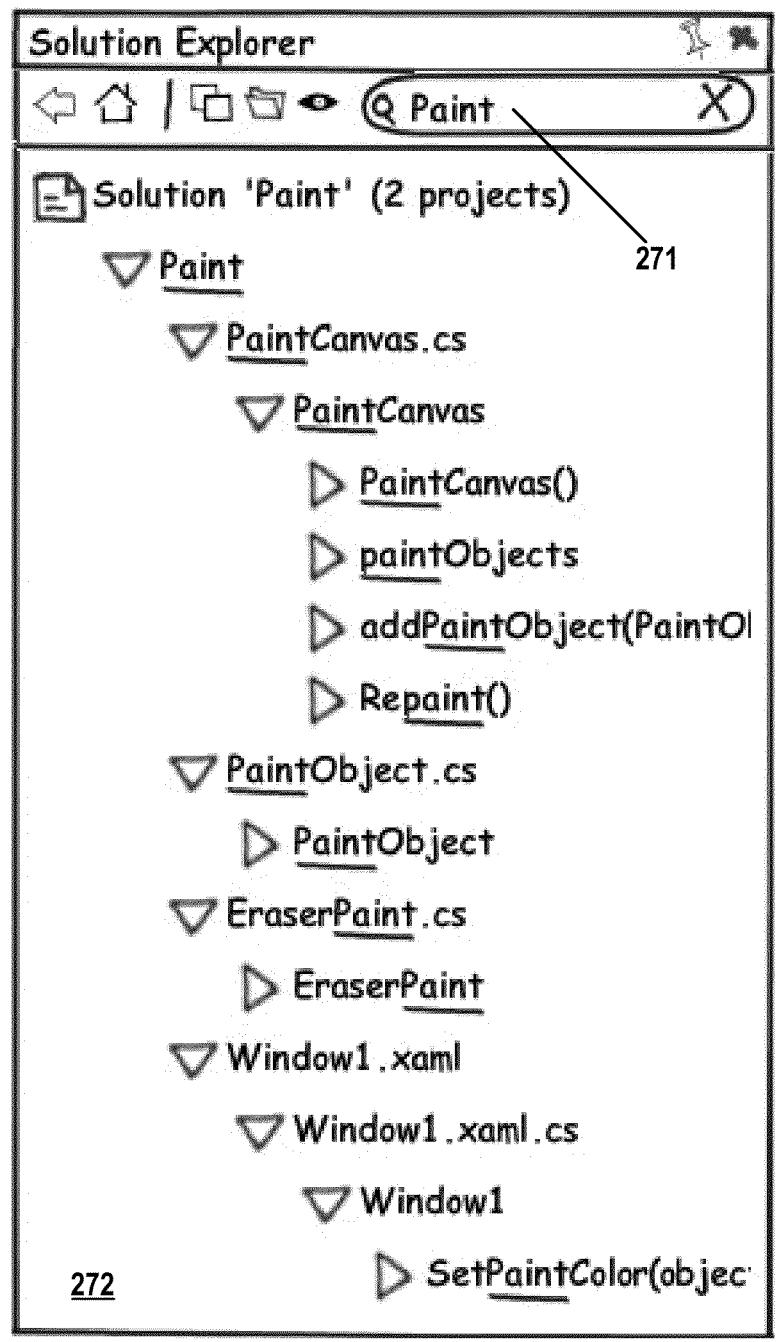
Figure 2E:
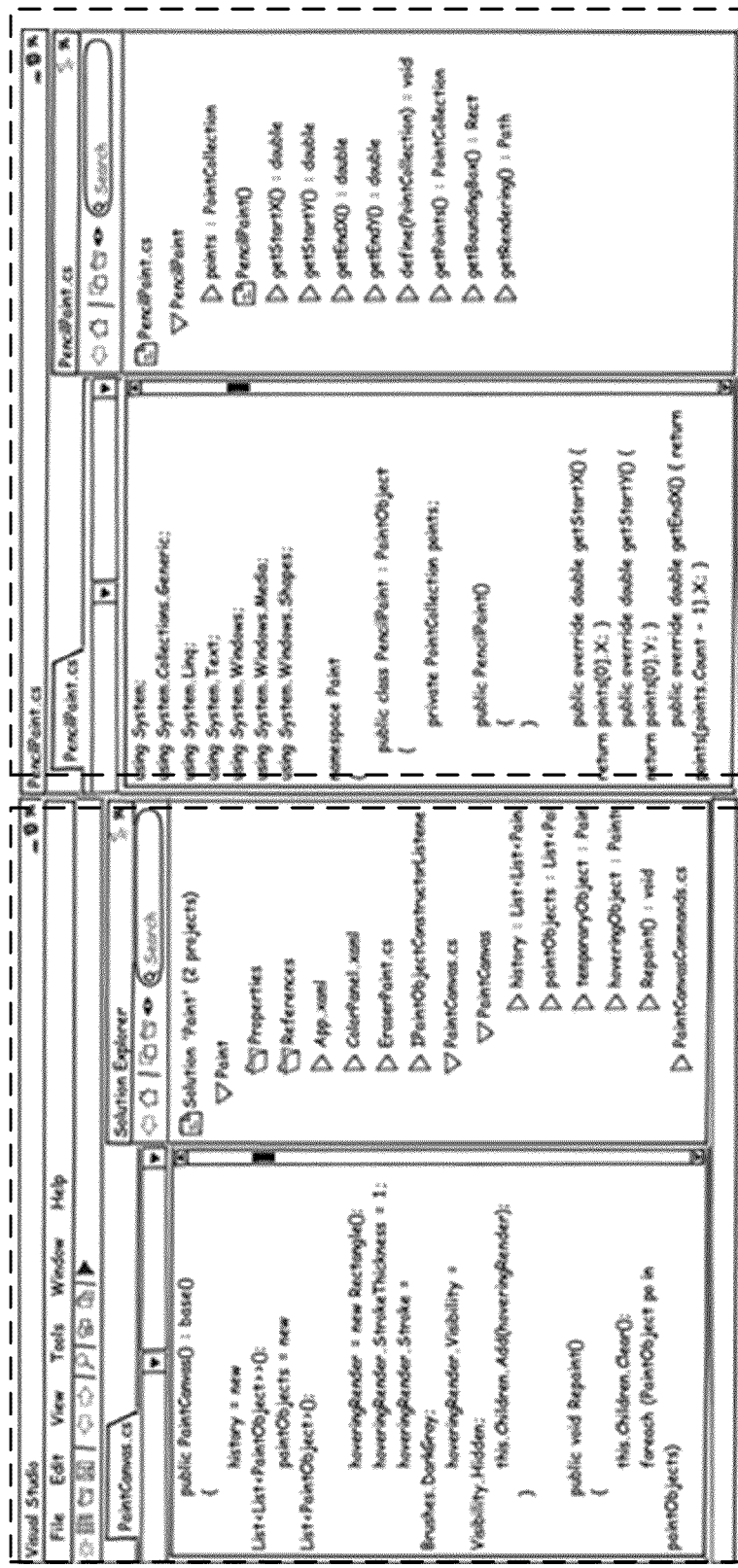

User interface 114 can be a multi-instance tool window as illustrated by FIG. 2e. FIG. 2e is an example of a user interface 234 that includes multiple instances of one or more information hierarchies. Multiple instances of displays can be stacked within an information pane (not shown). In FIG. 2e a first instance of an information hierarchy is displayed in information pane 235 and a second instance of an information hierarchy is displayed in information pane 236. Multiple views of an information hierarchy can be helpful when a user wants to view multiple roots concurrently. For example, suppose a user is working on a large code base comprising multiple folders or sub-directories within the code base. The user can create two instances of the display with one instance of the display set at the root of the first sub-directory and the second instance of the display set at the root of the second sub-directory. Multiple instances of the information hierarchy and associated display can be created to allow a user to jump between different locations in a large source code file. One instance can contain the entire hierarchy and the other instance can set its root as the file with the types and members expanded. As an example, a history of a relationship path such as the Call Hierarchy of a node can be kept by creating another instance of the display.

The user can create a new instance of an information hierarchy and associated display by selecting the pivot icon and then selecting a "new view" option (e.g., New View 214 in FIG. 2b) within the resulting options display.

The user interface can support searching with inline results in the display. By default, in accordance with some aspects of the subject matter disclosed herein, the "Contains" relationship can be searchable. However, a search provider can allow file contents to be searchable as described above.

Search results from multiple search providers can be aggregated and projected into a tree form as illustrated in user interface 270 of FIG. 2d. When the search module is asked to begin a search, the search module can ask each individual search provider to begin searching, and can wait until each search provider has completed the search to display the search tree. Alternatively, the search tree can be displayed as results are returned, and can display periodic updates of results in the search tree. In accordance with aspects of the subject matter described herein, results can be displayed in a filtered tree-view whose ordering is consistent with the default view. That is, nodes are not reordered based on relevancy. The search results may only display matches for the item types (e.g., projects, files, types, and members) contained in the source code base. Nodes that are children of members may not be displayed. For example, local variables in methods or method parameters are not displayed in the tree. A search can be symbol-based rather than text-based.

Each search result that is returned can have its parent chain constructed up to the top hierarchy level. All matches can be expanded and can have the matching search string highlighted or otherwise distinguished (e.g., in user interface 270 of FIG. 2d, the search string matches for the search string "Paint" 271 displayed in information pane 272 are underlined) in the node name. If no search results are returned, the text "No results found" can be displayed in the content area. Nodes that are part of the parent chain but that do not have any matching search terms can be styled differently than nodes that do have matching search terms. Each search term can be highlighted or otherwise visually distinguished in the result. Multiple search terms can be highlighted separately but with the same visual treatment.

Searching can be tied to a particular domain. To allow providers to provide optimized search implementations, search providers can aggregate search results from multiple domains. Each search provider can provide a method to begin searching. The search provider can be passed both the search terms and a collection to store search results in. A non-UI background thread can be used for the search. A cancellation token can be passed to the search provider. Upon receiving signaling of cancellation, the search provider can cease adding results to the result collection and can return to the caller.

Search providers can return a complete list of result items for their domain. The view, not the provider, can be responsible for filtering results to the current tree scope, and for placing the results back into a tree form.

After a search is executed, focus can remain in the search box. The first search result can be highlighted, allowing the user to press Enter to open the file. Pressing a Down arrow key can advance the focus to the next search result, making it easy to navigate between results. When a clear option is invoked, the display can be restored to the previous view stored on the navigation stack. Expanded nodes can be restored to their pre-search state. When a result is selected when a "clear"

option is invoked, the node representing the selected result can be selected after the clear operation is executed.

Pressing an escape button in the search box or when focus is on a node will cause the search to clear. The search result view can support context menus on items. In accordance with aspects of the subject matter disclosed herein, adding a node to the hierarchy may also add the node to the search view. The search may not be executed again, in which case, the added node may not need to match the search terms. In response to unloading and reloading a directory, the directory can be collapsed and subsequently expanded on reload. In response to adding a class, in accordance with some aspects of the subject matter disclosed herein, child nodes of the class may be displayed. Alternatively, children can be hidden for class files for which there are no matching members. An item in the search view can be renamed from the search view. Deleting an item in search results can removes the node and all of the node's children from the search view. Drag-and-drop reordering can be disabled. In the case where multiple instances of an information hierarchy exist, all the instances can be updated whenever a change is made in one of them. The user can clear the search term to reorder the nodes in the tree. In accordance with aspects of the subject matter disclosed herein, new files do not appear in the view. For example, if the user adds a file to a directory, the added file does not appear until the user clears the search. Renamed files can have their new text searched and the matching strings will be highlighted. Nodes that are renamed in other instances will not refresh in the instance with the search result. If a user has scoped the view to a directory the search will only return results that exist under the directory root node. If a user has scoped the view to a file within a directory, the search will only return results that exist under the file root node. When a relationship is being viewed, search can switch to the default view and search from the root node of the home directory. To scope the search, the node for which the search is to be scoped can be selected.

The user interface can show the hierarchy of search results, as illustrated in FIG. 2*d* user interface 270. A visual hierarchy can be displayed to show users parent information. All node types (e.g., projects, files, types, and members) can be displayed at the same respective indentation level, (e.g., all types are indented the same amount, etc.) spatial positioning can be used to determine the result type. Indentation can be dependent on the root element. For example, if a class with a parent chain of solution->project->file->class, nodes is displayed, the elements displayed may be displayed at different indentation levels than if the search was conducted in a scoped view in that file (e.g., only file->class are displayed).

A file that is previewed can be displayed in a way that is stylistically distinct from the visual representation of a fully opened document. A preview tab that identifies the previewed file can be separated from the collection of durable tabs in the user interface. For example, if the tab displaying the name of the durably opened file is located on the left side of the display, the tab displaying the name of the previewed file can be located on the right side of the display. If the preview tab already houses an identifier of a previously previewed file, the existing identifier can be removed and/or replaced with the current previewed file identifier. Similarly, if the preview file display already houses content associated with a previous previewed file, the content can be removed and/or replaced with the content associated with the current previewed file, thus reusing both the preview tab and the preview file display in the user interface. That is, both the preview display and the preview tab are reusable.

As described above, a previewed file is not automatically added to the working set in response to being previewed, as is the case with fully opened files. The working set can be comprised of all the files that were fully opened during the development activity. Files are only removed from the working set by an explicit action taken by a user closing the fully opened file. However, the transient previewed file can be promoted to a durable fully opened file and can be added to the working set in response to the promotion of the previewed file. In accordance with some aspects of the subject matter disclosed herein, when a previewed file is promoted, the content of the preview file display may be replaced with the content of the previous previewed file. Similarly, the identifier of the preview tab may be replaced with the corresponding identifier. The preview module 126, etc. can receive further input from a user indicating that a previewed file is to be promoted to a durable file. For example, a promote button can be presented on the user interface (e.g., on the preview tab, above the preview tab, etc.). In response to a user action clicking on the promote button, or otherwise selecting the promote command, the previewed file can be transformed to a durable file. Promotion of the previewed file to a durable file transforms the previewed file to a durable or fully opened file, adds it to the working set, removes the previewed file identifier from the preview tab, removes the previewed file content from the preview file display, removes the preview tab, and adds the identifier of the promoted previewed file to the collection of durable tabs displayed in the user interface.

User actions triggering previewing a file can be distinct from user actions triggering fully opening a file. In response to a user single-clicking on a member of the find results, the selected file can be previewed and displayed in a preview display of a user interface. The appearance of the preview tab can be stylistically distinct from the appearance of the durable tab. The preview tab can be spatially separated from the durable tabs (e.g., the preview tab can be on the right side of the display while durable tabs are on the left side of the display) and so on. Similarly, the previewed file identifier can be displayed in a different font than the durable tab is displayed in, and so on.

Figure 2F:
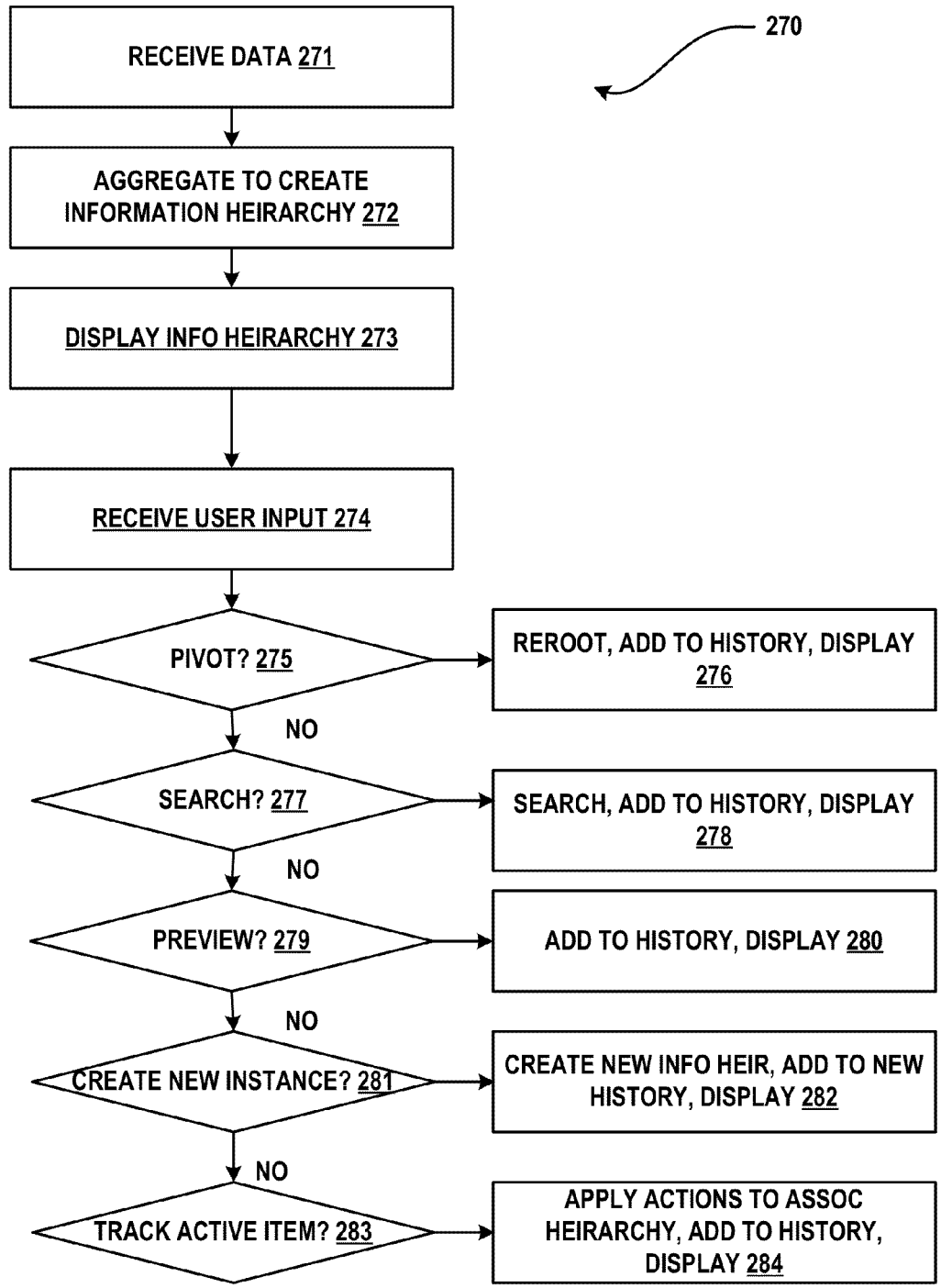
FIG. 2f is an example of a method for creating, displaying and interacting with relationship hubs in accordance with aspects of the subject matter disclosed herein.

FIG. 2*f* illustrates an example of a method 270 for creating and displaying relationship hubs in accordance with aspects of the subject matter disclosed herein. The method described in FIG. 2*f* can be practiced by a system such as but not limited to the one described with respect to FIG. 1. Some of the actions described below can be optional. Some of the actions described below can be executed in a sequence that differs from that described below.

At 271 data can be received. Data can be received from a file system, compilers, project systems, source files and so on in a software development context. Relationship data can also be received from third parties (item providers). At 272 the data can be aggregated and transformed to become one or more information hierarchies. At 273 the information hierarchy can be displayed in a user interface. At 274 user input can be received. User input can comprise any of the following: selection of a node in the information hierarchy, selection of a button or icon (described above), selection of a relationship type, selecting a button that displays a context menu to list additional commands related to the data, using input device guided drag-drop operations to rearrange items in the hierarchy (either by reordering the items or moving them to new containers), renaming an item, expanding items to display more data in the hierarchy, or collapsing items to hide data from the display, and so on. In response to detecting a pivot request at 275, at 276 the information hierarchy can be rerooted, as described above and the new information hierarchy can be displayed. The previous view can be added to the navigation history. In response to detecting a search request at 277, at 278 a search operation can be conducted and the new information hierarchy can be displayed. The previous view can be added to the navigation history. In response to detecting a preview request at 279, the browsed file is not added to the set of open files in the user's working set. At 280 in response to detecting a create new instance of a relationship hub request, a new instance of an information hierarchy and associated display can be created at 281 and the new information hierarchy can be displayed. A separate navigation stack can be maintained for the new instance of the relationship hub. At 282 in response to detecting a track active item request, actions applied to a tracked active item can be applied to an associated display.

For example, suppose a user is browsing an information hierarchy displayed in a navigation pane in an IDE in which a preview feature is in operation and in which a track active item is in operation. Suppose the user selects a node in the information hierarchy (274). In response, a preview pane may display the contents associated with the node in a content viewer pane (284). Because the preview feature is activated, the preview pane is scrolled to the area associated with the selected node (280). Suppose now that the user clicks a pivot button (275). In response to clicking the pivot button, the relationships associated with the selected node can be displayed in an overlay as illustrated in FIG. 2b option box 215. In response to the user selecting one of the displayed relationships, the information hierarchy displayed in the navigation pane can be rerooted to the selected node to create a new (second) information hierarchy. The information associated with the relationship can be added to the second information hierarchy as children of the selected node. Because the track active item feature is activated (283), the information hierarchy information is synchronized to the content viewer and the second information hierarchy can be displayed in the navigation pane (284).

Figure 2G:
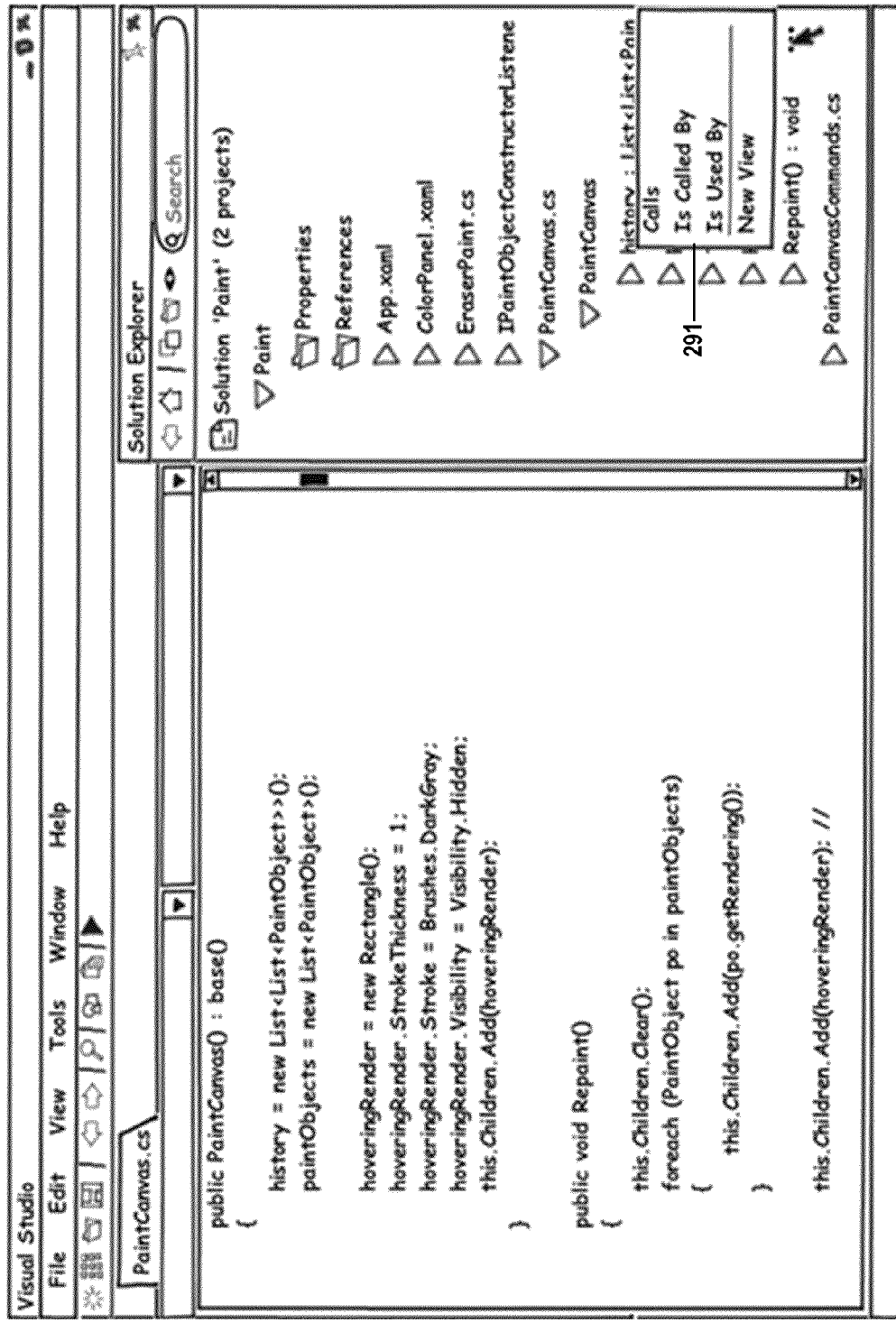
FIG. 2g is an illustration of an example of a user interface in accordance with aspects of the subject matter disclosed herein.

Suppose that the information hierarchy that the user was browsing was a software development project that included files, classes within the files and methods within the classes. Suppose that the node that the user selected was a particular method. The preview pane would display the file in which the selected method is located scrolled to the area of the file where the selected method is located. Suppose the relationships available for the method are "calls", "is called by" and "is used by" as illustrated by FIG. 2g user interface 290 option box 291. When the user selects the pivot option, these relationships can be displayed. Suppose the user selects the "is called by" relationship. In response all the methods that call the selected method can be displayed in the navigation pane by rerooting the information hierarchy to set the node for the selected method to the root node and adding the methods that call the selected method as children of the selected method. Because the track active item option is activated, the navigation pane is synchronized to the content viewer pane and displays the methods that call the selected method.

Suppose that the user would like to maintain the state of the navigation pane to aid him in his work. The user can create a new instance of the information hierarchy displayed in the navigation pane and can turn the track active item feature off. User interface 234 of FIG. 2e illustrates an example of a second instance 236 of a user interface 235 comprising a navigation pane and a content viewer pane. Because the track active item feature is turned off for the second instance of the user interface, the user can use the second instance of the user interface to keep the state of the information hierarchy and can use the first instance of the user interface to perform his tasks. It will be appreciated that while FIG. 2e illustrates two instances of the user interface, any number of instances of the user interface and underlying information hierarchy can be created.

Suppose that the user wants to modify the methods that that call the selected method. Suppose that the user would like to "freeze" the state of the navigation pane so that he can keep a list of all the methods that have to be changed in front of him. The user can create a new instance of the information hierarchy displayed in the navigation pane and can turn the track active item feature off. User interface 234 of FIG. 2e illustrates an example of a second instance 236 of a user interface 235 comprising a navigation pane and a content viewer pane. Because the track active item feature is turned off for the second instance of the user interface, the user can use the second instance of the user interface to keep a list of all the methods that he wants to change and can use the first instance of the user interface to change the methods that he wants to change.

Example of a Suitable Computing Environment

Figure 3:
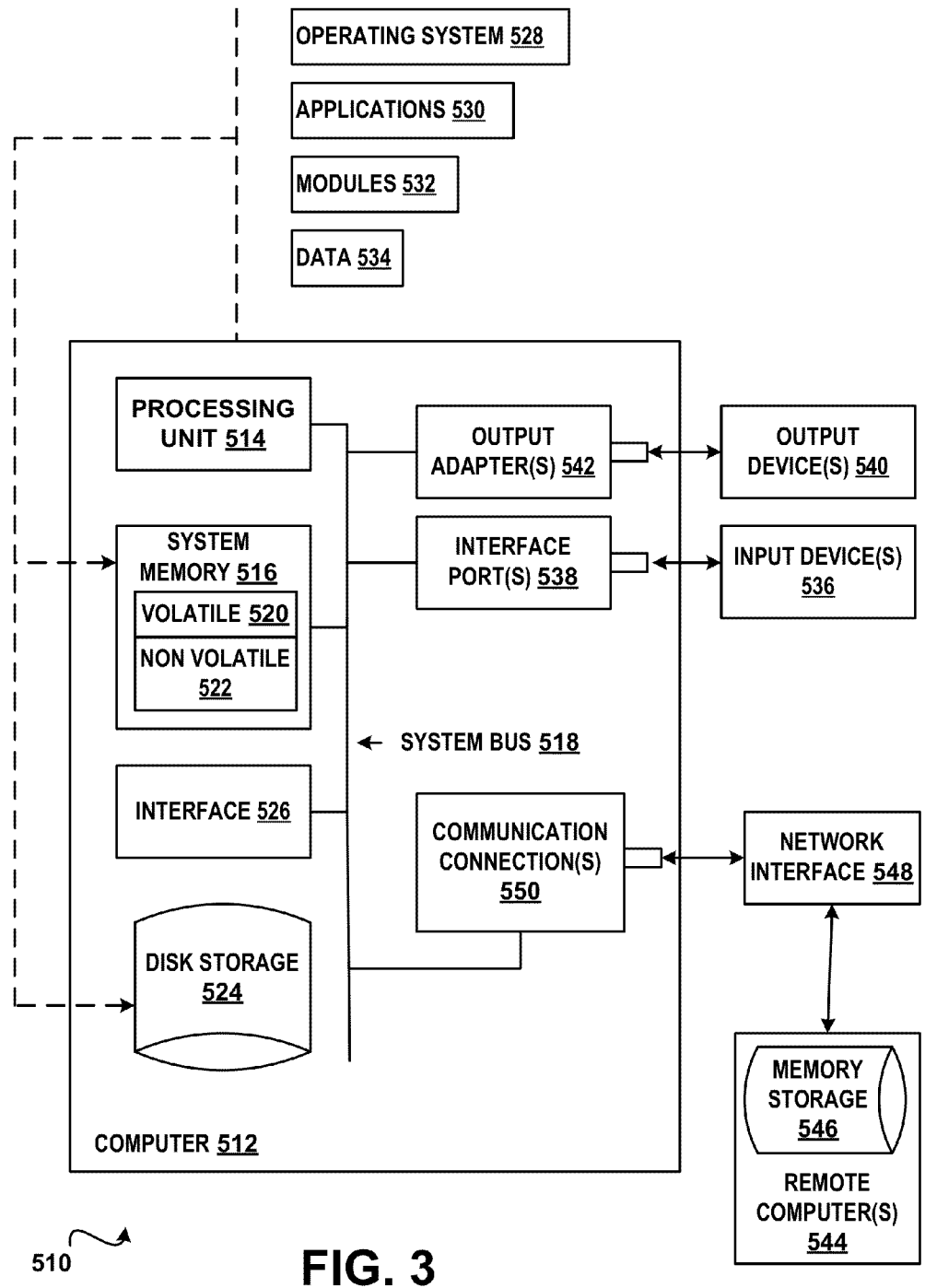
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
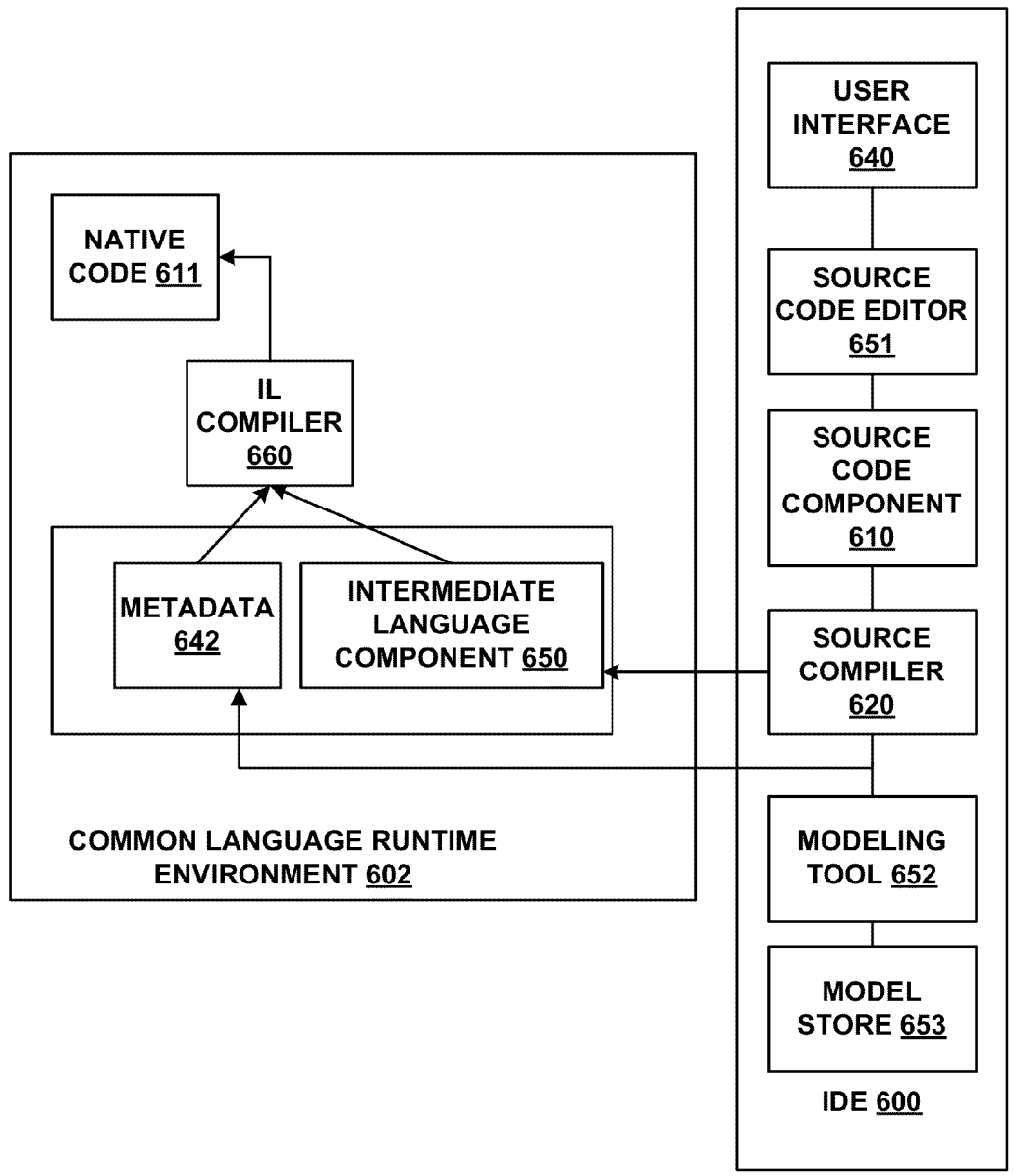
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s)

can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device;
   at least one module loaded into the memory causing the at least one processor to:
   concurrently display at least one view of an information hierarchy in a navigation pane and separately at least one view of content in a content pane, the navigation pane and the content pane displayed in a single user interface, wherein the at least one view of the content is scrolled to an area corresponding to a selected node in the information hierarchy;
   receive a pivot request for the selected node of the information hierarchy;
   receive a pivot selection, wherein the pivot selection is associated with the selected node of the information hierarchy and wherein the pivot selection provides additional information associated with the selected node;
   generate a second information hierarchy by making the selected node a root node for the second information hierarchy and adding child nodes derived from the additional information associated with the selected node to the second information hierarchy, wherein the at least one view of the content is synchronized to the second information hierarchy and is scrolled to an area corresponding to the second information hierarchy; and
   a history module that stores a chronological history of browsed nodes in the information hierarchy, selections, expansion states and scroll states within the information hierarchy.

2. The system of claim 1, wherein nodes of the information hierarchy browsed in the single user interface are presented in a preview area of the single user interface and are not added to a working set of files for a user session.

3. The system of claim 1, wherein the information hierarchy comprises a software development information hierarchy and wherein a relationship of a set of extensible relationships comprises: all nodes within the information hierarchy, classes within the information hierarchy, members of the classes within the information hierarchy, field or properties within the information hierarchy, methods within the information hierarchy and parameters of the methods within the information hierarchy, base types within the information hierarchy, derived types within the information hierarchy, references within the information hierarchy, called elements within the information hierarchy, or called by elements within the information hierarchy.

4. The system of claim 1, further comprising a module that displays a plurality of concurrent relationship sets within the single user interface.

5. The system of claim 1, wherein the single user interface combines functions comprising a hierarchical view of source code files, a user interface that provides a hierarchical view of source code classes, a user interface that provides a hierarchical view of source code objects, a user interface that provides a view of source code callers and source code callees, a user interface for searching and browsing source code, or a user interface that provides a search functionality for source code in the single user interface.

6. The system of claim 1, further comprises a search module that returns search results in a hierarchical user interface, wherein search information is provided by a third party and comprises results, artifacts or search logic associated with the search results.

7. A method comprising:
   concurrently displaying on a display device of a computer within a single user interface comprising at least a first information hierarchy in a navigation pane, content associated with the first information hierarchy in a content pane separate from the navigation pane and a list of relationships for the first information hierarchy;
   receiving a selection from the list of relationships, wherein in response to receiving the selection, a new navigation history is created;
   creating a second information hierarchy by adding information associated with the selected relationship to the second information hierarchy; and
   displaying the second information hierarchy in the navigation pane and automatically synchronizing content displayed in the content pane to the second information hierarchy.

8. The method of claim 7, wherein information associated with the selected relationship is received from a third party comprising an items provider.

9. The method of claim 7, wherein in response to receiving a pivot request comprising a request for display of a relationship for a selected node of the information hierarchy; generating the second information hierarchy by making the selected node a root node for the second information hierarchy and adding child nodes derived from the relationship information to the second information hierarchy.

10. The method of claim 7, wherein in response to receiving a search request, search results are displayed in a hierarchical display in a pane of the plurality of panes in the single user interface, wherein a search module requests at least one search provider to execute the search request and wherein the search results displayed in the hierarchical display are received from the at least one search provider.

11. The method of claim 7, wherein in response to receiving a scoping request, a rerooting operation is executed on a selected node and child nodes of the selected node are displayed.

12. The method of claim 7, wherein in response to receiving a preview request, a previewed file is displayed in a single reusable preview pane, the preview pane stylistically distinguishable from a display displaying a fully opened file.

13. A computer-readable storage device comprising computer-executable instructions which when executed cause at least one processor of a computing device to:
   concurrently display information from a plurality of software development tool windows in a single user interface comprising a navigation pane displaying an information hierarchy of directories, sub-directories, files, classes, members of the classes, methods, and parameters of the methods and a content viewer separate from the navigation pane, the content viewer displaying content automatically scrolled to an area corresponding to a selected node in the information hierarchy;
   receive user input selecting a node of the information hierarchy and in response replacing a root node of the information hierarchy with the selected node to create a second information hierarchy; and
   maintain a chronological history of navigation history.

14. The computer-readable storage device of claim 13, comprising further computer-executable instructions, which when executed cause at least one processor to:
   display relationships available for the selected node.

15. The computer-readable storage device of claim 13, comprising further computer-executable instructions, which when executed cause at least one processor to:
 create a new information hierarchy appending relationship information for the selected node to the new information hierarchy and converting the selected node to a root node of the new information hierarchy.

16. The computer-readable storage device of claim 15, comprising further computer-executable instructions, which when executed cause at least one processor to:
 receive a search request, and in response display search results in a hierarchical display.

17. The computer-readable storage device of claim 13, comprising further computer-executable instructions, which when executed cause at least one processor to:
 receive a preview request, wherein a previewed file is displayed in a single reusable preview display, the preview display stylistically distinguishable from a display displaying a fully opened file.

\* \* \* \* \*